Feb. 3, 1959
P. SIMINOFF
2,872,373
CANDICIDIN PURIFICATION
Filed Dec. 13, 1954
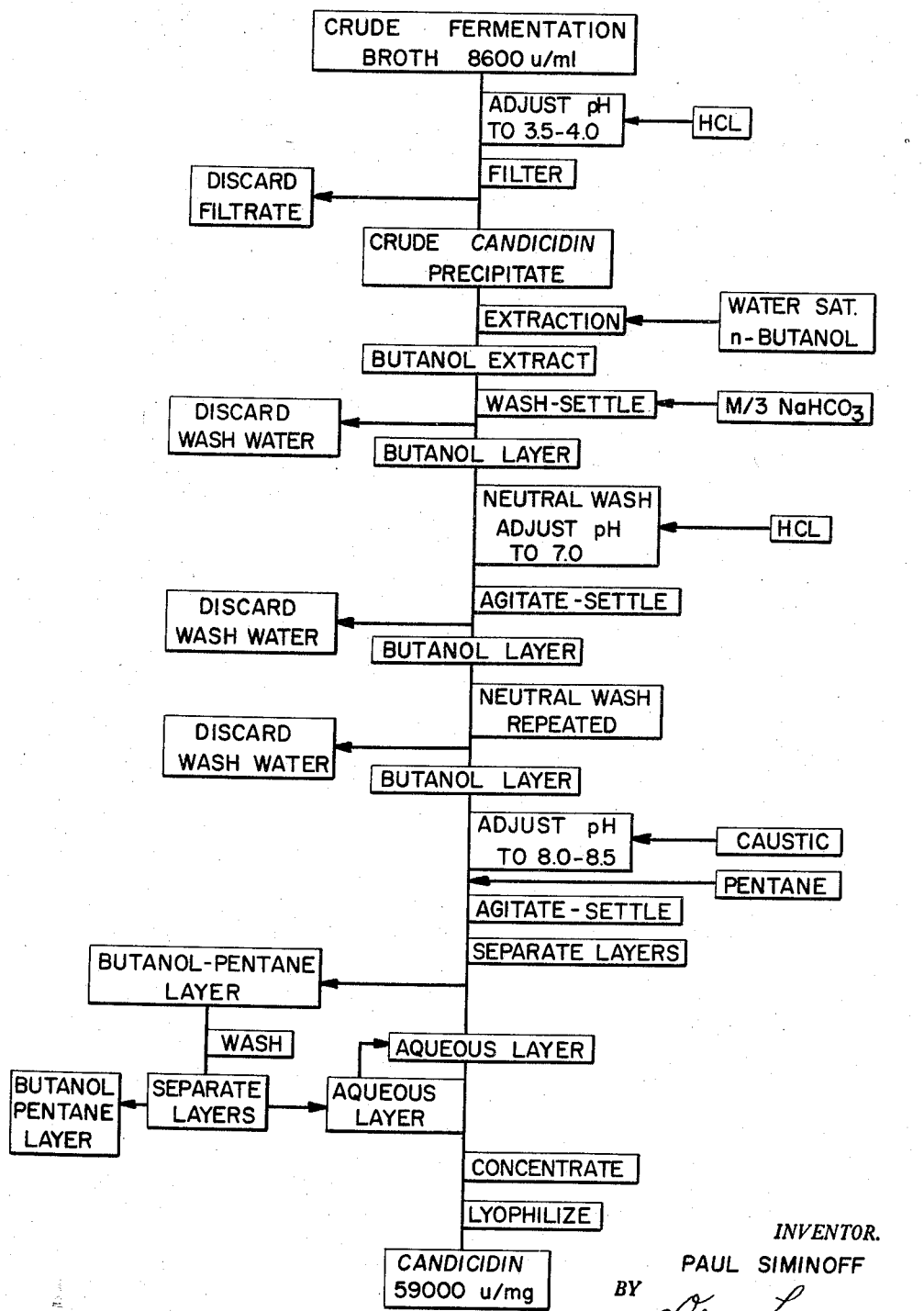
INVENTOR.
PAUL SIMINOFF
BY Dean Lawrence
ATTORNEY United States Patent Office 2,872,373
Patented Feb. 3, 1959

2,872,373
CANDICIDIN PURIFICATION

Paul Siminoff, Kalamazoo, Mich., assignor to S. B. Penick & Company, Incorporated, New York, N. Y., a corporation of Delaware Application December 13, 1954, Serial No. 474,993

1 Claim. (Cl. 167—65)

My invention relates to an improvement in the recovery of refined fermentation solids, having candicidin potency, from crude fermentation products, and with the solids so obtained. More particularly, my invention is concerned with a process which enables me to obtain, from crude fermentation products and in high yields, fermentation solids of high candicidin potencies of not less than about 35,000 units per milligram which are uniformly soluble in water.

Hubert Lechevalier et al. were the first to describe "Candicidin, a New Antifungal Antibiotic," in Mycologia XLV, No. 2, 155–171, March–April 1953. They produced candicidin by growing a culture of the organism *Streptomyces griseus* No. 3570 on a yeast-glucose medium, isolating a "crude candicidin" from the resulting broth and purifying it. By this pioneering method, they were able to obtain broths having candicidin potencies of 1000 to 5000 u./ml. and to isolate therefrom a "crude candicidin" having a potency of 3000 u./mg. in a yield of 40 to 60%. They defined a unit as "the minimum amount of antibiotic per ml. of peptone-glucose agar which completely inhibited the growth of *Candida albicans* 204." When they purified the product, they obtained three fractions, candicidin A, B and C, having little biological activity (C), or potencies of 5500 u./mg. (A) and 6500 u./mg. (B) or about twice the potency of the "crude candicidin." Fraction A was soluble in water and alcohol and was obtained in a yield of about 50% relative to crude product. Fraction B was insoluble in these solvents, and the yield was about 50% relative to the crude product.

In their extraction and purification process Lechevalier et al. treated the whole fermentation culture, including the mycelium, with HCl to give a pH of 2.5, and stirred into it 0.5% Hyflo-supercel. The supercel pad which retained the antibiotic present both in the broth and in the mycelium, was filtered off and eluted with an equal volume of n-butanol. The eluate was extracted with aqueous sodium bicarbonate solution, concentrated to dryness in vacuo and extracted with petroleum ether. The "crude candicidin" thus was suspended in water and freeze-dried. It was then fractionated by the use of organic solvents or chromatography to yield fractions A, B and C described above.

It is desirable to produce from a crude fermentation liquor or solids, instead of fractions of differing solubilities and low yields and potencies, a uniformly water-soluble solid of high potency in high yields.

In furtherance of these objects, my invention includes the following steps: A fermentation liquor having candicidin activity is adjusted to a pH of about 3.5–4. A "crude candicidin" is thus obtained in the form of a precipitate which is filtered off. The filter cake is extracted with a wet, substantially water-immiscible lower aliphatic alcohol such as n-butanol. The extract is washed with an alkaline solution below about pH 8.5, followed by a neutral water wash, then adjusted to a pH of about 8.0 to 8.5 and a substantially water-immiscible hydrocarbon or oxygenated hydrocarbon solvent added. A solid is then recovered from the resulting aqueous extract in the usual manner by concentrating the extract and freeze-drying or spray-drying it.

I have found that in this manner I obtain purified, uniformly water-soluble products in yields of at least 70% of the activity of the fermentation liquor, which products possess potencies of at least 35,000 u./mg. as compared with potencies varying from 600 to 3000 u./mg. of the acid precipitates from which they were obtained. The solids were assayed against a candicidin B standard obtained from Dr. Selman A. Waksman, Institute of Microbiology, New Brunswick, N. J.

The following examples illustrate my invention:

*Example 1*

Fifty gm. of crude candicidin cake assaying 670 u./mg. were extracted three times with 500, 300 and 200 ml. portions of water-saturated n-butanol. The extracts were combined and washed three times with 20 ml. portions of M/3 NaHCO₃. Seventy-five ml. of distilled water was then added, the pH adjusted with HCl to 7.0, the mixture stirred, allowed to settle and the water drawn. This step was repeated with another 75 ml. water wash at neutral pH. The butanol layer wash was adjusted to pH 8.0 with caustic, 1 liter of pentane added, the mixture agitated and the aqueous layer allowed to separate and drawn. The residual butanol-pentane phase was washed three times with 50 ml. portions of distilled water and the washes added to the aqueous layer. The combined aqueous phases were vacuum-concentrated to 100 ml. and lyophilized to yield 705.2 mg. of water-soluble candicidin assaying 43,000 u./mg. for a recovery of 90.5%. Ultra violet absorption spectrum in alcohol-ethylene-glycol solution of this material showed strong maxima at 342, 362, 384 and 406 m having $E_1^1$ values respectively of 219, 303, 394 and 326.

*Example 2*

To nineteen liters of beer assaying 8600 units per ml. or a total of 163,400,000 units was added concentrated HCl to pH 4.0. One hundred grams of Hy-flo filter aid were added and the suspension filtered over a Hy-flo bed. The cake was extracted with 3 one-liter portions of water-saturated n-butanol and the combined extracts were washed with three 60-ml. aliquots of M/3 NaHCO₃. The bicarbonate washes containing a red pigment were discarded. Three hundred ml. of distilled water were added to the butanol layer, the pH adjusted with vigorous stirring to 7.0 with HCl, the layers allowed to separate and the water drawn off and discarded. The wash was repeated with an additional 300 ml. of water. The butanol layer was then adjusted to pH 8.0 with NaOH and 3 liters of pentane added. An aqueous layer separated out and was drawn off. The butanol-pentane phase was washed three times with 200 ml. aliquots of distilled water and the washes were combined with the aqueous squeeze. The combined squeeze was concentrated in vacuo to 80 ml. and lyophilized to yield 2.41 gm. of solid assaying 59,000 units per mg. for a total recovery of 142,190,000 units. Efficiency of recovery was 87.2%. U. V. absorption spectrum in alcohol-ethyleneglycol solution of this material showed major peaks at 342, 362, 382 and 404 mu having respective $E_1^1$ values of 215, 310, 422 and 313.

Among the crude fermentation liquors which I use as my initial materials are those produced by the organism *Streptomyces griseus* No. 3570 in fermentation media containing, as essential ingredients, proteinaceous and carbohydrate materials. They are described, for example, by Hubert Lechevalier et al. above referred to. The substantially water-immiscible lower aliphatic alcohol which I employ to extract the active material from my acid precipitate, may be n-butanol, sec. butanol, isobutanol, amyl alcohol and the like. The substantially water-immiscible hydrocarbon or oxygenated hydrocarbon solvent which I use to squeeze the active material from these extracts into water of high alkalinity may be pentane, lower-alkyl ethers such as anhydrous ether, petroleum ether, and the like.

When I applied the extraction and purification method of Lechevalier et al. described above to my acid filter cake of crude candicidin, elution with the cake with n-butanol removed only about 25% of the original activity whereas my method applied to the same cake gave almost 100% elution. It is apparent, therefore, that my method is substantially more efficient than the known method. I have found that candicidin is relatively unstable in acid solution and that in order to keep inactivation to a minimum during the acid precipitation step, the pH should be no more than about 3.5 to 4 instead of 2.5 as in the process of Lechevalier et al. Furthermore, I have found that the method and products of Lechevalier et al. can be greatly simplified and improved upon by eliminating from the process the steps of concentrating the butanol extract, washing the concentrate with petroleum ether, and fractionating it. I have discovered that the active material can be more fully recovered from the butanol extract by squeezing it from the extract into water in the presence of a substantially water-immiscible organic solvent, provided that the water has an alkaline pH of about 8.0 to 8.5, and recovering the active material from this solution as described; and that the material thus obtained is greatly superior to fractions A and B of Lechevalier et al. because it is uniformly water-soluble and has a potency at least about twenty times higher than that of the acid precipitate from which it is obtained, while the activity of fractions A and B is only about twice that of the corresponding "crude candicidin."

Having thus shown that my novel method described herein greatly improves the method of Lechevalier et al. for concentrating and purifying "crude candicidin" and candicidin fermentation liquors, what I claim is:

In the production of candicidin having uniform water solubility and a potency of at least 35,000 units per milligram from a crude fermentation liquor containing candicidin, the steps which include: adjusting the pH of the crude fermentation liquor to between about 3.5 and about 4.0 to precipitate a candicidin-containing solid; extracting the candicidin from said solid with a substantially water-immiscible lower alkanol; adding aqueous material to the alcoholic extract to form a two-phase system; adjusting the pH of the aqueous phase to between about 8.0 and about 8.5; adding a substantially water-immiscible organic material selected from the group consisting of aliphatic hydrocarbons and lower-alkyl ethers to the alcoholic phase to squeeze the candicidin out of the organic alcoholic phase into the aqueous phase; and, recovering candicidin from said aqueous phase.

References Cited in the file of this patent

UNITED STATES PATENTS

| | | |
|---|---|---|
| 2,476,085 | Dimick et al. | July 12, 1949 |
| 2,516,080 | Sobin et al. | July 18, 1950 |
| 2,723,216 | Cohen | Nov. 8, 1955 |

OTHER REFERENCES

Kligman et al.: Proc. Soc. Exp. Biol. and Med., 1953, vol. 82, pp. 399–404.

Lechevalier et al.: Mycelogia, vol. XLV, No. 2, March–April 1953, pp. 155–171 (p. 159 pert.).

Raubitschek et al.: Antibiotics and Chemotherapy, April 1952, pp. 179–183 (p. 181 pert.).

Mann et al.: Antibiotics and Chemotherapy, December 1953, p. 1279.

Oroshnik et al.: Science, February 4, 1955, pp. 147–148.

UNITED STATES PATENT OFFICE
CERTIFICATE OF CORRECTION

Patent No. 2,872,373 February 3, 1959

Paul Siminoff

It is hereby certified that error appears in the printed specification of the above numbered patent requiring correction and that the said Letters Patent should read as corrected below.

Column 1, line 56, for "thus was suspended" read -- thus obtained was suspended --.

Signed and sealed this 26th day of May 1959.

(SEAL)
Attest:

KARL H. AXLINE
Attesting Officer

ROBERT C. WATSON
Commissioner of Patents